United States Patent
Pope et al.

(10) Patent No.: US 8,380,882 B2
(45) Date of Patent: *Feb. 19, 2013

(54) PACKET VALIDATION IN VIRTUAL NETWORK INTERFACE ARCHITECTURE

(75) Inventors: Steve L. Pope, Cambridge (GB); David J. Riddoch, Cambridge (GB); Ching Yu, Santa Clara, CA (US); Derek Roberts, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/612,078

(22) Filed: Nov. 4, 2009

(65) Prior Publication Data

US 2010/0049876 A1 Feb. 25, 2010

Related U.S. Application Data

(63) Continuation of application No. 11/116,018, filed on Apr. 27, 2005, now Pat. No. 7,634,584.

(51) Int. Cl.
*G06F 15/16* (2006.01)
(52) U.S. Cl. ........................................................ 709/250
(58) Field of Classification Search .................. 709/250
See application file for complete search history.

(56) References Cited

U.S. PATENT DOCUMENTS

| | | |
|---|---|---|
| 4,805,134 A | 2/1989 | Calo et al. |
| 5,272,599 A | 12/1993 | Koenen |
| 5,325,532 A | 6/1994 | Crosswy et al. |
| 5,636,371 A | 6/1997 | Yu |
| 5,677,910 A | 10/1997 | Delaney |
| 5,740,467 A | 4/1998 | Chmielecki, Jr. et al. |
| 5,790,804 A | 8/1998 | Osborne |
| 5,946,189 A | 8/1999 | Koenen et al. |
| 6,044,415 A | 3/2000 | Futral et al. |
| 6,070,219 A * | 5/2000 | McAlpine et al. ............ 710/263 |
| 6,098,112 A | 8/2000 | Ishijima et al. |
| 6,122,670 A | 9/2000 | Bennett et al. |
| 6,160,554 A | 12/2000 | Krause |

(Continued)

FOREIGN PATENT DOCUMENTS

| | | |
|---|---|---|
| EP | 620521 A2 | 10/1994 |
| WO | 0148972 A1 | 7/2001 |

(Continued)

OTHER PUBLICATIONS

Regnier G., "Protocol Onload vs. Offload," 14th Symposium on High Performance Interconnects, Aug. 23, 2006, 1pp.

(Continued)

*Primary Examiner* — Christopher Biagini
(74) *Attorney, Agent, or Firm* — Warren S. Wolfeld; Haynes Beffel & Wolfeld LLP

(57) ABSTRACT

Roughly described, a network interface device receiving data packets from a computing device for transmission onto a network, the data packets having a certain characteristic, transmits the packet only if the sending queue has authority to send packets having that characteristic. The data packet characteristics can include transport protocol number, source and destination port numbers, source and destination IP addresses, for example. Authorizations can be programmed into the NIC by a kernel routine upon establishment of the transmit queue, based on the privilege level of the process for which the queue is being established. In this way, a user process can use an untrusted user-level protocol stack to initiate data transmission onto the network, while the NIC protects the remainder of the system or network from certain kinds of compromise.

13 Claims, 13 Drawing Sheets

U.S. PATENT DOCUMENTS

| | | |
|---|---|---|
| 6,304,945 B1 | 10/2001 | Koenen |
| 6,332,195 B1 | 12/2001 | Green et al. |
| 6,349,035 B1 | 2/2002 | Koenen |
| 6,438,130 B1 | 8/2002 | Kagan et al. |
| 6,496,935 B1 | 12/2002 | Fink et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,799,220 B1 | 9/2004 | Merritt et al. |
| 6,865,672 B1 | 3/2005 | Carmeli |
| 6,868,450 B1 | 3/2005 | Lucovsky |
| 6,904,534 B2 | 6/2005 | Koenen |
| 6,931,530 B2 | 8/2005 | Pham et al. |
| 6,934,758 B2 | 8/2005 | Scheifler et al. |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,111,303 B2 | 9/2006 | Macchiano et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0185011 A1 | 8/2006 | Cromer et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |

| | | | |
|---|---|---|---|
| WO | 2011043769 A1 | 4/2011 | |
| WO | 2011053305 A1 | 5/2011 | |
| WO | 2011053330 A1 | 5/2011 | |

OTHER PUBLICATIONS

Montry G., OpenFabrics Alliance presentation slides, 14th Symposium on High Performance Interconnects, Aug. 23, 2006, 8pp.
Riddoch D. et al, "Distributed Computing with the CLAN Network," Laboratory for Communications Engineering, Cambridge, England, SIGCOMM 2002, 13 pp.
Mansley K., "Engineering a User-Level TCP for the CLAN Network," Laboratory for Communication Engineering, Univ. Cambridge, England, AGM SIGCOMM Aug. 2003 Workshops, pp. 228-236.
Gordon E. Moore; Electronics, vol. 38, No. 8, pp. 114-117, Apr. 19, 1965.
Jack B. Dennis and Earl C. Van Horn; Communications of the ACM, vol. 9, No. 3, pp. 143-155, Mar. 1966.
Marvin Zelkowitz; Communications of the ACM, vol. 14, No. 6, p. 417-418, Jun. 1971.
J. Carver Hill; Communications of the ACM, vol. 16, No. 6, p. 350-351, Jun. 1973.
F.F. Kuo; ACM Computer Communication Review, vol. 4 No. 1, Jan. 1974.
Vinton Cerf, Robert Kahn; IEEE Transactions on Communications, vol. COM-22, No. 5, pp. 637-648, May 1974.
V. Cerf, et al.; ACM Computer Communication Review, vol. 6 No. 1, p. 1-18, Jan. 1976.
Robert M. Metcalfe and David R. Boggs; Communications of the ACM, vol. 19, Issue 7, pp. 395-404, Jul. 1976.
P. Kermani and L. Kleinrock; Computer Networks, vol. 3, No. 4, pp. 267-286, Sep. 1979.
John M. McQuillan, et al.; Proceedings of the 6th Data Communications Symposium, p. 63, Nov. 1979.
Andrew D. Birrell, et al.; Communications of the ACM, vol. 25, Issue 4, pp. 260-274, Apr. 1982.
Ian M. Leslie, et al.; ACM Computer Communication Review, vol. 14, No. 2, pp. 2-9, Jun. 1984.
John Nagle; ACM Computer Communication Review, vol. 14, No. 4, p. 11-17, Oct. 1984.
Robert M. Brandriff, et al.; ACM Computer Communication Review, vol. 15, No. 4, Sep. 1985.
C. Kline; ACM Computer Communication Review, vol. 17, No. 5, Aug. 1987.
Christopher A. Kent, Jeffrey C. Mogul; ACM Computer Communication Review, vol. 17, No. 5, pp. 390-401, Oct. 1987.
Gary S. Delp, et al.; ACM Computer Communication Review, vol. 18, No. 4, p. 165-174, Aug. 1988.
David R. Boggs, et al.; ACM Computer Communication Review, vol. 18, No. 4, p. 222-234, Aug. 1988.
H. Kanakia and D. Cheriton; ACM Computer Communication Review, vol. 18, No. 4, p. 175-187, Aug. 1988.
V. Jacobson; ACM Computer Communication Review, vol. 18, No. 4, p. 314-329, Aug. 1988.
David D. Clark; ACM Computer Communication Review, vol. 18, No. 4, pp. 106-114, Aug. 1988.
Paul V. Mockapetris, Kevin J. Dunlap; ACM Computer Communication Review, vol. 18, No. 4, pp. 123-133, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, Apr. 1989.
R. Braden, et al.; ACM Computer Communication Review, vol. 19, No. 2, p. 86-94, Apr. 1989.
David D. Clark, et al.; IEEE Communications Magazine, vol. 27, No. 6, pp. 23-29, Jun. 1989.
David R. Cheriton; ACM Computer Communication Review, vol. 19, No. 4, p. 158-169, Sep. 1989.
Derek Robert McAuley; PhD Thesis, University of Cambridge, Sep. 1989.
Craig Partridge; ACM Computer Communication Review, vol. 20, No. 1, p. 44-53, Jan. 1990.
D. D. Clark and D. L. Tennenhouse; ACM Computer Communication Review, vol. 20, No. 4, pp. 200-208, Sep. 1990.
Eric C. Cooper, et al.; ACM Computer Communication Review, vol. 20, No. 4, p. 135-144, Sep. 1990.
Bruce S. Davie; ACM Computer Communication Review, vol. 21, No. 4, Sep. 1991.
C. Brendan S. Traw, et al.; ACM Computer Communication Review, vol. 21, No. 4, p. 317-325, Sep. 1991.
Ian Leslie and Derek R. McAuley; ACM Computer Communication Review, vol. 21, No. 4, p. 327, Sep. 1991.
Mark Hayter, Derek McAuley; ACM Operating Systems Review, vol. 25, Issue 4, p. 14-21, Oct. 1991.
Gregory G. Finn; ACM Computer Communication Review, vol. 21, No. 5, p. 18-29, Oct. 1991.
Greg Chesson; Proceedings of the Third International Conference on High Speed Networking, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, Oct. 1992.
Peter Steenkiste; ACM Computer Communication Review, vol. 22, No. 4, Oct. 1992.
Paul E. McKenney and Ken F. Dove; ACM Computer Communication Review, vol. 22, No. 4, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, Feb. 1993.
E. Ruetsche; ACM Computer Communication Review, vol. 23, No. 3, Jul. 1993.
Jonathan M. Smith and C. Brendan S. Traw; IEEE Network, vol. 7, Issue 4, pp. 44-52, Jul. 1993.
Jeffrey R. Michel; MSci Thesis, University of Virginia, 1993, Aug. 1993.
Mark David Hayter; PhD Thesis, University of Cambridge, Sep. 1993.
Jonathan Kay and Joseph Pasquale; ACM Computer Communication Review, vol. 23, No. 4, pp. 259-268, Oct. 1993.
W. E. Leland, et al.; ACM Computer Communication Review, vol. 23, No. 4, p. 85-95, Oct. 1993.
C. A. Thekkath, et al.; ACM Computer Communication Review, vol. 23, No. 4, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, Dec. 1993.
Matthias Kaiserswerth; IEEE/ACM Transactions on Networking, vol. 1, No. 6, p. 650-663, Dec. 1993.
Chris Maeda, Brian Bershad; ACM Operating Systems Review, vol. 27, Issue 5, p. 244-255, Dec. 1993.
Greg Regnier, et al.; IEEE Micro, vol. 24, No. 1, p. 24-31, Jan. 1994.
J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 1994.
Various forum members; Message-Passing Interface Forum, University of Tennessee, Knoxville, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.

A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference 1996, Jan. 1996.

Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.

* cited by examiner

| SUB-PAGE ADDRESS | RESOURCE ID | PROCESS TAG | ROW |
|---|---|---|---|
| OOF0 | OIA0 | 0010 | 1 |
| OOF2 | OIA1 | 0010 | 2 |
| OOF4 | OIA2 | 0011 | 3 |
| ⋮ | ⋮ | ⋮ | ⋮ |

*FIG. 2A*

| QUEUE ID | ALLOWED PROTOCOL |
|---|---|
| | |
| | |
| | |
| | |
| | |
| | |

*FIG. 7*

| SRC IP | SRC PORT | DEST IP | DEST PORT | QUEUE ID | ALLOWED PROTOCOL |
|---|---|---|---|---|---|
| | | | | | |
| | | | | | |
| | | | | | |
| | | | | | |
| | | | | | |
| | | | | | |

*FIG. 8*

PACKET VALIDATION IN VIRTUAL NETWORK INTERFACE ARCHITECTURE

REFERENCE TO RELATED APPLICATIONS

This application is a continuation of U.S. patent application Ser. No. 11/116,018, filed 27 Apr. 2005, incorporated herein by reference in its entirety.

BACKGROUND

1. Field of the Invention

The invention relates to network interfaces, and more particularly to mechanisms for validating network traffic sent or received by user level libraries in a virtual network architecture.

2. Description of Related Art

A typical computer system includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral devices must do so by calling routines in the operating system. The placement of exclusive control of the peripheral devices in the operating system also helps to modularize the system, obviating the need for each separate application program to implement its own software code for controlling the hardware.

The placement of exclusive control of the peripheral devices in the operating system also permits management of another potential difficulty, that of improper control or handling of the peripheral device. For network interface devices, for example, improper or inappropriate control of the devices could compromise other applications running in the computer system, or could compromise or otherwise negatively impact operation of the network to which the device is connected. In established operating systems, much of the software code for controlling these devices has evolved over a number of years and has been updated and improved in response to numerous tests by numerous people on numerous types of network interface devices. The software code in the operating system has therefore developed a certain level of trust: users, network administrators, network architects and other network devices can presume that the great majority of packets originating from this software code will conform to network protocol specifications. Additional code for controlling each particular peripheral device is incorporated into the operating system in the form of a device driver specific to the particular peripheral device. Device drivers are usually written by or in association with the manufacturer of the particular peripheral device, so they too are afforded a certain level of trust.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive. Address spaces are sometimes referred to herein as "virtual" address spaces, in order to emphasize the possibility of such mappings.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application, and also performs certain checks to make sure outgoing data packets have authorized characteristics and are not malformed. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack. In one implementation, TCP and other protocols are implemented twice: once built into the kernel and once built into a user level transport library accessible to application programs. In order to control and/or communicate with the network interface device an application issues API (application programming interface) calls. Some API calls may be handled by the user level transport libraries, and the remainder can typically be passed on through the interface between the application and the operating system to be handled by the libraries that are available only to the operating system. For implementation with many operating systems it is convenient for the transport libraries to use existing Ethernet/IP based control-plane structures: e.g. SNMP and ARP protocols via the OS interface.

There are a number of difficulties in implementing transport protocols at user level. Most implementations to date have been based on porting pre-existing kernel code bases to user level. Examples of these are Arsenic and Jet-stream. These have demonstrated the potential of user-level transports, but have not addressed a number of the problems required to achieve a complete, robust, high-performance commercially viable implementation.

One particular problem with user-level transport libraries is that in bypassing many of the routines normally performed in the kernel, they also lose the trust normally accorded those routines. This is because the kernel no longer has control of the user-level routines and cannot enforce their identity with those in the kernel. Users or application programs are able to modify the user-level transport routines, or replace them with others provided by a third party. As a result, the support of user-level transport libraries to bypass kernel routines and avoid context switches, increases the risk of malformed or even malicious traffic driven onto the network.

Part of the risk of permitting user-level transport libraries can be overcome by virtualizing the network interface device in such a way that each process is aware of only its own resources. The hardware can be virtualized in such a way that one process cannot transmit or receive data on behalf of another, nor can one process see the data belonging to another process. But this kind of virtualization does not prevent a process from transmitting problematic data packets out onto the network through its own assigned resources; hence trust is still not ensured.

In order to address issues like the latter, roughly described, a network interface device receiving data packets from a computing device for transmission onto a network, the data packets having a certain characteristic, transmits the packet only if the sending queue has authority to send packets having that characteristic. The data packet characteristics can include transport protocol number, source and destination port numbers, source and destination IP addresses, for example. Authorizations can be programmed into the NIC by a kernel routine upon establishment of the transmit queue, based on the privilege level of the process for which the queue is being established. In this way, a user process can use an untrusted user-level protocol stack to initiate data transmission onto the network, while the NIC protects the remainder of the system from certain kinds of compromise.

BRIEF DESCRIPTION OF THE DRAWINGS

The invention will be described with respect to specific embodiments thereof, and reference will be made to the drawings, in which:

FIG. 2A illustrates an example bus mapping table of FIG. 2.

FIGS. 7 and 8 illustrate alternative example authorizations databases maintained in the NIC of FIG. 1.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
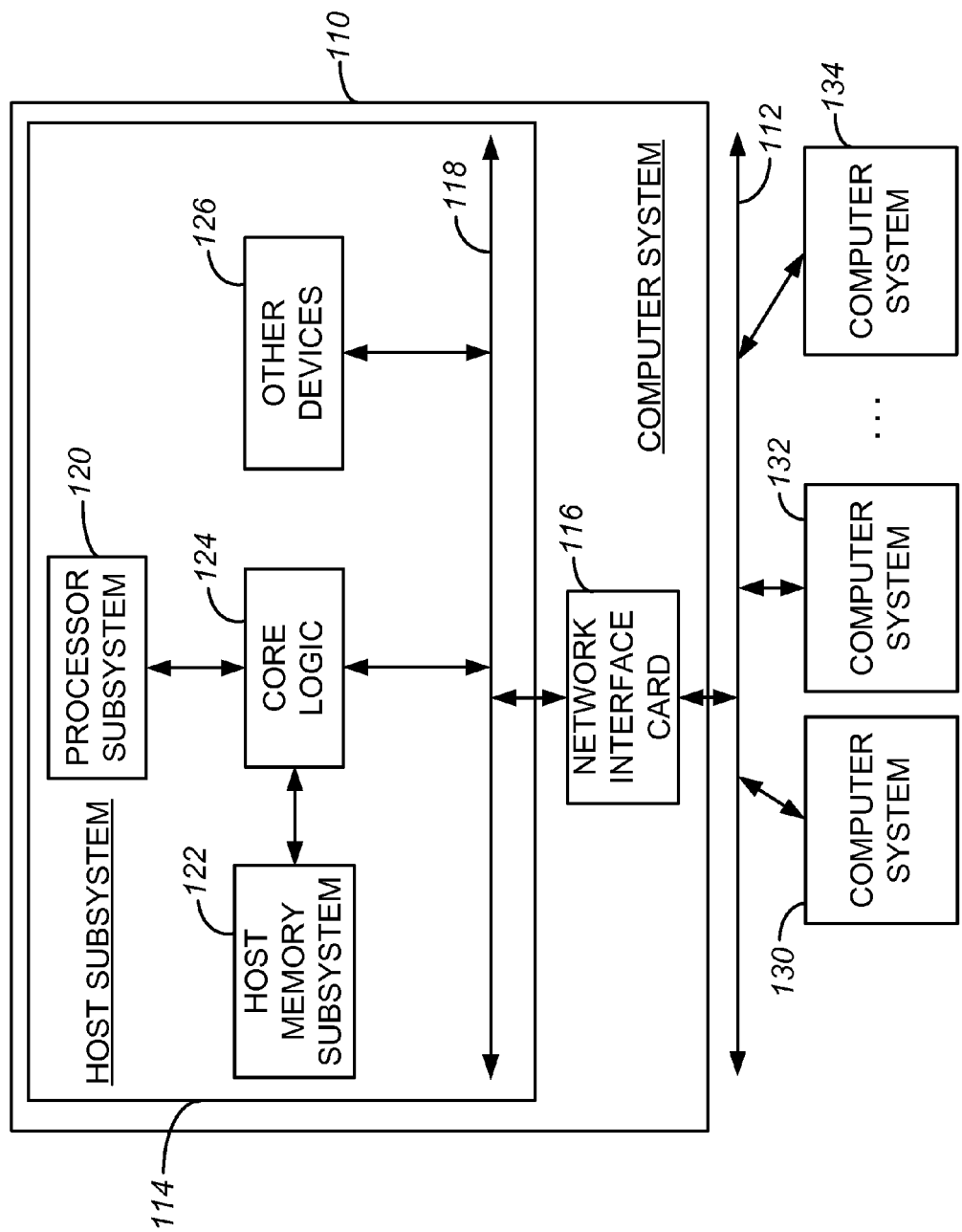
FIG. 1 is a simplified block diagram of a typical computer system incorporating features of the invention.

FIG. 1 is a simplified block diagram of a typical computer system 110 which can communicate via a network 112 with other computer systems such as 130, 132 and 134. Computer system 110 includes a network interface card (NIC) 116 communicating via a communication channel 118 with a host subsystem 114. The host subsystem 114 includes a processor subsystem 120 which includes at least one processor, a host memory subsystem 122, and a core logic subsystem 124. The core logic subsystem 124 provides bridges among the processor subsystem 120, the host memory subsystem 122 and the communication channel 118. The host subsystem 114 may also include other devices 126 in communication with the communication channel 118. As used herein, the host subsystem 114 is considered to be one type of "computing device". Other types of computing devices include non-re-configurable processing devices for which network connectivity is desired.

The network interface card 116 provides an interface to outside networks, including an interface to the network 112, and is coupled via network 112 to corresponding interface devices in other computer systems. The physical hardware component of network interfaces are referred to herein as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

Network 112 may comprise many interconnected computer systems and communication links. These communication links may be wireline links, optical links, wireless links or any other mechanism for communication of information. While in one embodiment network 112 is the Internet, in other embodiments, network 112 may be any suitable computer network or combination of networks. In and embodiment described herein, network 112 supports an Ethernet protocol.

Host memory subsystem 122 typically includes a number of memories including a main random access memory (RAM) for storage of instructions and data during program execution, and a read only memory (ROM) in which fixed instructions and data are stored. One or more levels of cache memory may also be included in the host memory subsystem 122. For simplicity of discussion, the host memory subsystem 122 is sometimes referred to herein simply as "host memory". As used herein, virtual memory is considered part of the host memory subsystem even though part of it may be stored physically at various times on a peripheral device.

The communication channel 118 provides a mechanism for allowing the various components and subsystems of computer system 110 to communicate with each other. In one embodiment the communication channel 118 comprises a PCI bus. Other embodiments may include other buses, and may also include multiple buses.

Computer system 110 itself can be a varying types including a personal computer, a portable computer, a workstation, a computer terminal, a network computer, a television, a mainframe, a server or any other data processing system or user devices. Due to the ever-changing nature of computers and networks, the description of computer system 110 depicted in FIG. 1 is intended only as a specific example for purposes of illustrating an embodiment of the present invention. Many other configurations of computer system 110 are possible having more or less components, and configured similarly or differently than, the computer system depicted in FIG. 1.

Figure 2:
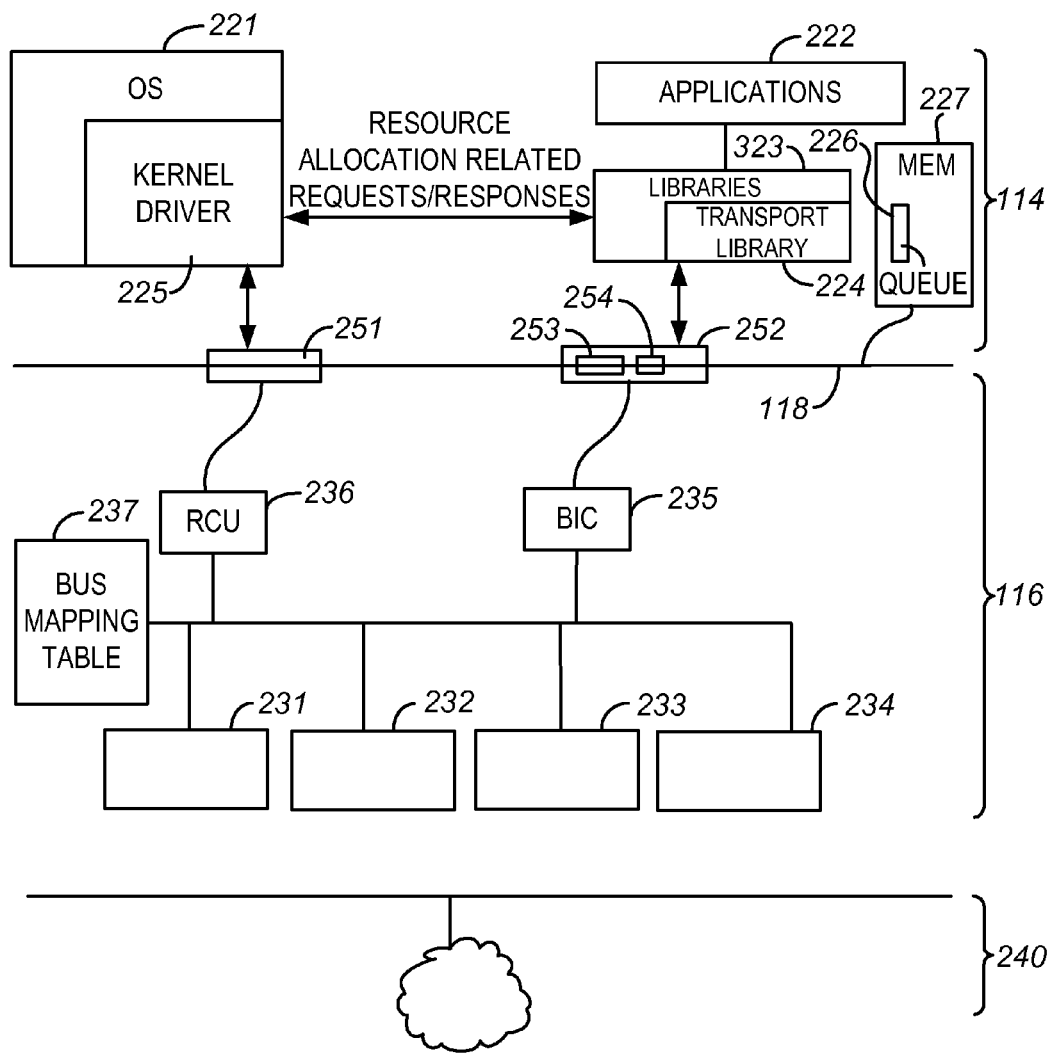
FIG. 2 is another view of the computer system of FIG. 1.

FIG. 2 is another view of the computer system 110, presented to better illustrate software and functional features. The computer runs an operating system 221 which is capable of supporting application processes 222 also running on the computer. As used herein, a "process" is a program, for example an application program, in execution. A process may run multiple "threads", which can also be thought of as lightweight processes. A library 223 of instructions is stored by the computer and available to the applications. The part of the library usable for communications with the NIC 116 is termed a transport library 224. Included in the operating system kernel is a driver component 225: a dedicated set of instructions which allow for data transfer with the NIC 116. Each application would normally take the form of a software program running on the computer, but it could be embedded in firmware. Some operating systems include applications in addition to fundamental operating system code. Aspects of the system that are not described herein may be as set out in PCT publication No. WO2004/025477, incorporated herein by reference in its entirety.

The NIC 116 can support resources of a number of types: i.e. resources having capabilities of different natures. Examples include DMA queues, event queues, timers and support resources for remote apertures of the type described in WO2004/025477. Each type of resource (231-234) is provided from a dedicated hardware resource pool which can support numerous instances of resources of the respective type. In order for such an instance to be made operational it must be configured by means of instructions from the computing device 114, as described in more detail below.

The NIC 116 communicates with the computing device 114 over the bus 118. In this example the bus is a PCI bus, but the invention is not limited to such a bus. Data transmitted over the PCI bus 118 is associated with a destination address and is received by whichever entity that is connected to the bus has had that address allocated to it. In a typical PC implementation the addresses are allocated in pages of 4 or 8 kB. One or more of these pages may be allocated to the NIC 116. Blocks 251 and 252 represent allocated pages on the PCI bus 118.

The NIC 116 has a bus interface controller 235, a resource configuration unit 236 and a bus mapping table 237. The resource configuration unit processes communications received from the computer that provide instructions on the allocation, re-allocation and de-allocation of resources on the NIC 116, and configures the resources in accordance with such instructions. The kernel driver 225 stores a record of which resources on the NIC 116 are allocated. When a resource is to be allocated the driver 225 identifies a suitable free resource of the required type on the NIC 116 and transmits an allocation instruction to the NIC 116. The instruction identifies the resource and specifies the details of how it is to be allocated, including details of the internal configuration of the resource (e.g. in the case of a timer the amount of time it is to run for). That instruction is passed to the resource configuration unit. The resource configuration unit then loads the specified configuration into the identified resource. The instruction also includes an ownership string, which may be an identification of which application or process on the computer is using the resource. The resource configuration unit stores these in a row of the bus mapping table. An example of entries in the bus mapping table is shown in FIG. 2A and is described in more detail below. When a resource is to be re-allocated the relevant entries in the resource's own configuration store and in the bus mapping table are altered as necessary. When a resource is to be de-allocated it is disabled and any rows of the bus mapping table that relate to it are deleted.

The general operation of the system of FIGS. 1 and 2 for the transfer of data to and from the network will now be described.

During setup of the system one or more pages (251, 252) on the bus 118 are allocated to the NIC 116. Part of this address space (page 251) can be used by the kernel driver 225 to send instructions to the NIC 116. Other pages (e.g. page 252) can be used for communication between application processes such as application 222 and the resources 231-234. The resource configuration unit 236 stores a record of the pages that are allocated to the NIC 116 for use by resources. Note that in some embodiments, some or all of the functions of the resource configuration unit 236 may alternatively be provided by the kernel driver 225 itself.

When an application 222 wishes to open a data connection over the network it calls a routine in the user level transport library 224 to cause the NIC resources that are required for the connection to be allocated. Standard types of network connection require standard sets of resources; for example: an event queue, transmit (TX) and receive (RX) DMA queues, and a set of direct memory accessible (DMA'able) memory buffers. For example a typical set may contain one TX queue, one RX queue, two timers, and on the order of 100 DMA memory buffers.

The user level transport library 224 includes routines that can be called directly by the application process 222 and that initiate the allocation of such standard sets of resources, including set numbers of resources of different types. The transport library also includes routines that allow a resource of each type to be allocated, re-allocated or de-allocated individually. The presence of both these types of instruction means that standard connections can be set up efficiently, and yet non-standard groups of resources can be created, and existing connections can be reconfigured on a resource-by-resource basis. As used herein, a "user level stack" is any protocol processing software that runs in unprotected mode. A "protocol stack" is the set of data structures and logical entities associated with the networking interfaces. This includes sockets, protocol drivers, and the media device drivers.

The routines for allocation, re-allocation and de-allocation of resources require access to restricted memory mapped addresses, such as page 251 for sending configuration instructions to the NIC 116. Since the user level transport library 224 lacks the necessary privilege level to perform these accesses, these routines in the user level transport library 224 make calls to the kernel driver 225. In a Unix environment, for example, such calls might take the form of IOCtl( ) system calls. These calls cause an initial context switch to a kernel level process, which in turn communicate the instructions to the NIC 116 for the allocation of the resources as specified in the routines. Those instructions specify the identity of the application or process with which the resources are to be associated, and the nature of the resources. The instructions are processed by the resource configuration unit 236 of the NIC 116.

A feature of the system of FIG. 2 is that the space on the bus 118 that is allocated to the NIC 116 can be split dynamically between the resources on the bus 118. Once one or more pages 252 have been allocated to the NIC 116 for use by resources those resources can be allocated one or more individual sub-page addresses within that page, corresponding to locations as illustrated at 253, 254. Thus each resource can have a part of the total space allocated to it. A record of which part of the total space is allocated to which resource is stored in the bus mapping table 237. The effect is that a single page of the bus can be used for communication to resources of multiple types and/or resources that relate to multiple connections and/or resources that are associated with multiple applications or processes on the computer 114. As a result, the total bus space can be used relatively efficiently.

The usage of the allocated bus space 252 is managed by the kernel driver 225. When a resource is to be allocated the RCU identifies using a data store whose content it manages an unused block in the space on the bus that has already been allocated for use by resources of the NIC 116, the space being of the size required for the resource. It then stores in that data store the identity of the resource ("resource ID"), the address of the block within the allocated space ("sub-page ID"), and the identity of the application or process that is to use the resource ("process tag"); and sends a message to the resource configuration unit (RCU) 236 to cause it to store corresponding data in the bus mapping table 237 (as shown in FIG. 2A). If the RCU finds that table 237 indicates the address to be already occupied then it returns an error code to the driver. The sub-page address may need to be supplemented with the address of the page in which the sub-page lies if that cannot be inferred as a result of only a single page having been allocated for use by the resources. If the total space allocated for use by resources is insufficient then the kernel driver allocates it more space. Having allocated the resources, the RCU returns a success message to the kernel driver. The allocated page and sub-page addresses are returned to and mapped into the virtual address space of the user level process that requested the resources in order that it can access them by means of that data. Another context switch then takes place back to the user level calling process.

An application that has had resources allocated to it can access them by sending data (e.g. by means of load/store cycles through a virtual memory mapping) to the relevant bus page, at the sub-page address corresponding to the respective resource. Since these addresses are part of the application's virtual address space, no context switch to any kernel level processes are required in order to perform these accesses. Any data sent to pages allocated to resources is picked off the bus 118 by the bus interface controller 235. It directs that data to the appropriate one of the resources 231-234 by performing a look-up in the table 237 to identify the identity of the resource to which the sub-page address has been allocated. An application can also access a resource by means other than a bus write: for example by means of direct memory access (DMA). In those instances, the NIC 116 checks that the identity of the application/process from which the access has been received matches the identity indicated in the table 237 for the resource. If it does not match, the data is ignored. If it matches, it is passed to the relevant resource. This adds to security and helps to prevent corruption of the resources by other applications.

The set of resources allocated to an application or process may be considered to constitute a virtual network interface (VNIC).

Once a virtual interface has been composed, it may be reconfigured dynamically. As one example of dynamic reconfiguration, a resource that is no longer required may be freed-up. To achieve this the application using the resource calls a de-allocation routine in the user level transport library 223. The de-allocation routine calls the kernel driver 225, which instructs the RCU to de-allocate the resource by disabling it, clearing its status and deleting its row in the table 237.

As another example of dynamic reconfiguration, additional resources may be added to the VNIC. The process is analogous to that described above for initial composition of the VNIC.

As yet another example of dynamic reconfiguration, resources may be passed from one application or process to another. This is most useful in the situation where a single application has multiple processes and wants to pass control of a resource from one process to another, for example if data from the network is to be received into and processed by a new process. To achieve this the application using the resource calls a re-allocation routine in the transport library 223. The re-allocation routine calls the kernel driver 225, which instructs the RCU to re-allocate the resource modifying its row in the table 237 to specify the identity of the application or process that is taking over its control.

In some instances it may be desirable for resources of one type to communicate with resources of another type. For example, data received from the network 240 may be being passed to an application 222 for processing. The application has a queue 226 in a memory 227 connected to the bus 118. The queue is managed in part by the transport library 223, which provides a DMA queue resource 231 on the NIC 116 with an up-to-date pointer to the next available location on the queue 226. This is updated as the application reads data from the queue 226. When data is received from the network it is passed to an event queue resource 232, which writes it to the location identified by the pointer and also triggers an event such as an interrupt on the computing device 114 to indicate that data is available on the queue. In order for this to happen the event queue resource 232 must learn the pointer details from the DMA queue resource 231. This requires data to be passed from the DMA queue resource to the event queue resource.

To achieve this the "process tag" column of the table 237 can be treated more generally as an ownership tag, and can link the DMA queue to the related event queue. To achieve this the ownership tag of the event queue can be set to the identity of the related DMA queue. When the DMA queue needs to pass data to the related event queue it can identify the event queue from the table 237 by performing a look-up on its own identity in the ownership tag column.

Data intended to be passed from one resource to another can be checked by the bus controller 235 to ensure that it is compatible with the settings in the table 237. Specifically, when data is to be sent from one resource to another the bus controller checks that there is a row in the table 237 that has the identity of the resource that is the source of the data in the ownership tag field, and the identity of the resource that is the intended destination of the data in the resource ID field. If there is no match then the data is prevented from reaching its destination. This provides additional security and protection against corruption. Alternatively, or in addition, it may be permitted for one resource to transmit data to another if both are in common ownership: in this example if their resource ID fields indicate that they are owned by the same process, application or other resource.

The identities of resources linked in this way can also be reconfigured dynamically by means of the re-configuration routines in the transport library.

Figure 3:
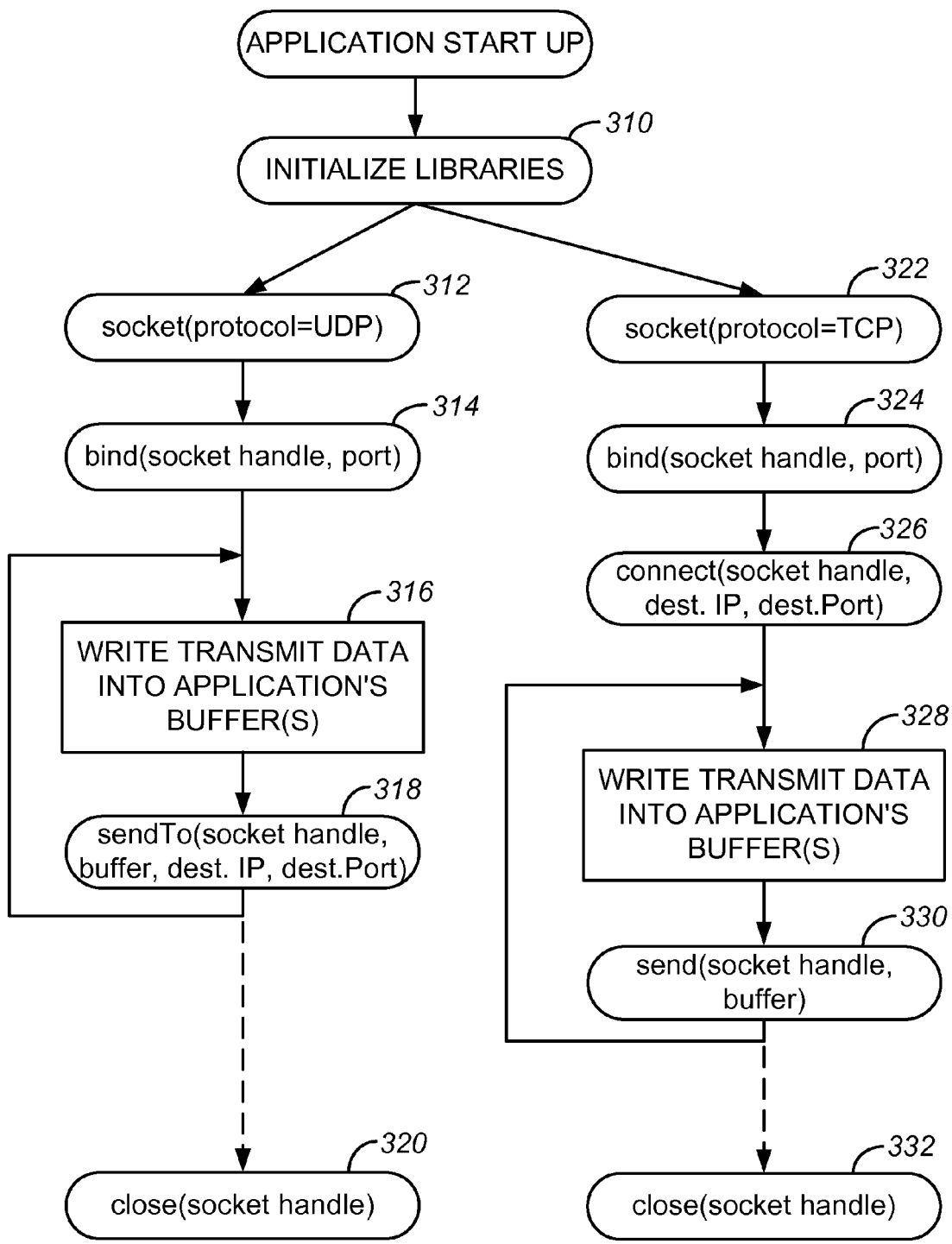
FIG. 3 is a flowchart example of steps that an application process might follow in the system of FIGS. 1 and 2 for the creation and transmission of IP packets onto a network.

FIG. 3 is an example broad outline of steps that an application process might follow in the system of FIGS. 1 and 2 for the creation and transmission of IP packets onto the network 112. This flowchart covers only the TCP and UDP transport level protocols; other embodiments can support other protocols, including but not limited to SCTP, RTP, ICMP and IGMP.

In a step 310, when the application first starts up, its libraries are initialized. This includes the user level transport library 224, which is initialized into the application's virtual address space.

Step 312 begins an example sequence of steps in which the application process uses a UDP transport protocol. In step 312 the application makes a call to the socket( ) routine of the user level transport library 224, specifying that it would like a UDP socket. In step 314, the application process binds the socket to a port using a call to the bind( ) routine of the user level transport library 224, and in step 316, it begins writing its transmit data into the applications buffers in the application's virtual address space. In step 318, after sufficient data has been written into the buffers for one or more data packets, the application process makes a call to the sendTo( ) routine of the user level transport library 224, specifying the socket handle, the buffer or buffers, the destination IP address and the destination port to which the packet is to be sent. Steps 316 and 318 are repeated many times, most likely interspersed with many other functions performed by the application process. When the application has finished with the socket that it had created in step 312, then in step 320, the application makes a call to the close( ) routine of the user level transport library 224 in order to close the socket.

Alternatively to the UDP sequence beginning with step 312, step 322 begins an example sequence of steps in which the application process uses a TCP transport protocol. In step 322, instead of calling the socket routine of the user level transport library 224 to specify the UDP protocol, it calls the socket routine to specify the TCP protocol. In step 324 the application process calls the bind( ) routine similarly to step 314, in order to bind the socket to a port. In step 326, since the transport protocol is now TCP, the application process calls the connect( ) routine of the user level transport library 224, in order to form a TCP connection with a specified destination IP address and port. In step 328 the application process writes transmit data into buffers in the application program's virtual address space, similarly to step 316, and in step 330, when ready, the application process calls the send( ) routine of the user level transport library 224 in order to have the data packet processed according to the TCP protocol and transmitted out to the network via network interface card 116. Again, steps 328 and 330 can be repeated many times, and when the application process has finished with the socket, it calls the close( ) routine of the user level transport library 224 (step 332).

As can be seen, of all the steps illustrated FIG. 3, only the step 310 of initializing the transport library 224 need involve a context switch to a kernel level process. In many embodiments, all of the remaining steps can be performed by the user level transport library 224 without involvement of the kernel driver 225. While this feature can help improve performance markedly, it also creates a risk that non-standard or third-party transport libraries will be installed for the application program in place of trusted code. As will be seen, the network interface card 116 itself protects against one or more of the risks that might arise.

Figure 4:
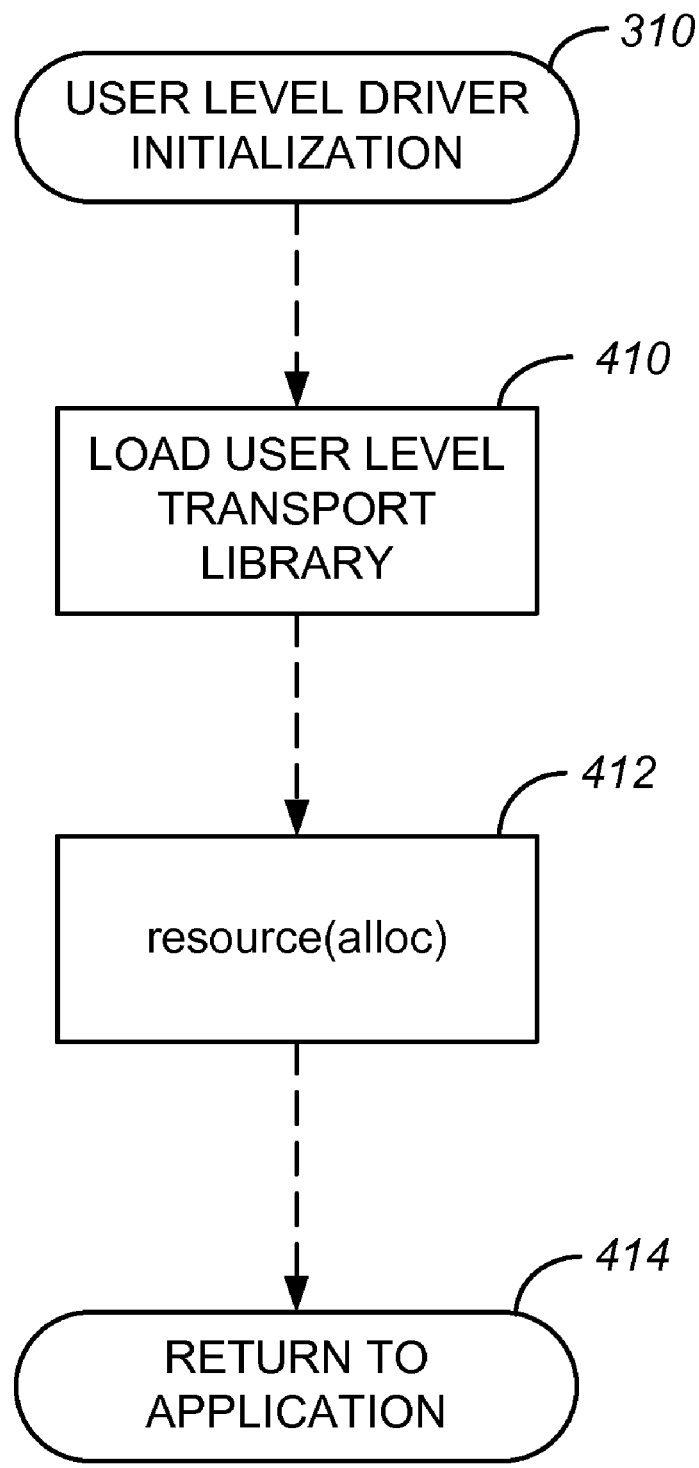
FIG. 4 is a flowchart of steps that might be performed during the library initialization step of FIG. 3.

FIG. 4 is a flowchart of steps that might be performed during the library initialization step 310 of FIG. 3. In step 410, the user level transport library 224 is loaded into the application's virtual address space. In a conventional system, the transport library loaded in step 410 might be a very thin layer (or incorporated within another general purpose library such as glibc), which does little more than make calls to the kernel driver 225 and return any results to the application. In the system of FIGS. 1 and 2, however, the transport library loaded in step 410 is more sophisticated in that it includes the user level routines described herein. To the extent that the user level transport library loaded in step 410 bypasses or performs functions differently than as described herein, the system can protect against certain kinds of errors.

In step 412, as part of the initialization of the user level transport library, a resource allocation routine in the kernel driver 225 is invoked. The kernel level routine is required for allocating resources in the network interface card and the host memory subsystem 122, since these resources are outside the virtual address space of the application, or involve direct hardware accesses that advisedly are restricted to kernel processes. After resource allocation, the user level driver initialization routine 310 may perform a number of other steps before it returns to the application in step 414.

The kernel resource allocation routine 412 allocates memory and an initial set of resources for the application program, and maps these into the application's virtual address space. Before discussing the particular steps performed by the kernel resource allocation routine 412, it will be useful to understand some of the formats in which the system maintains its queue structures.

Figure 5:
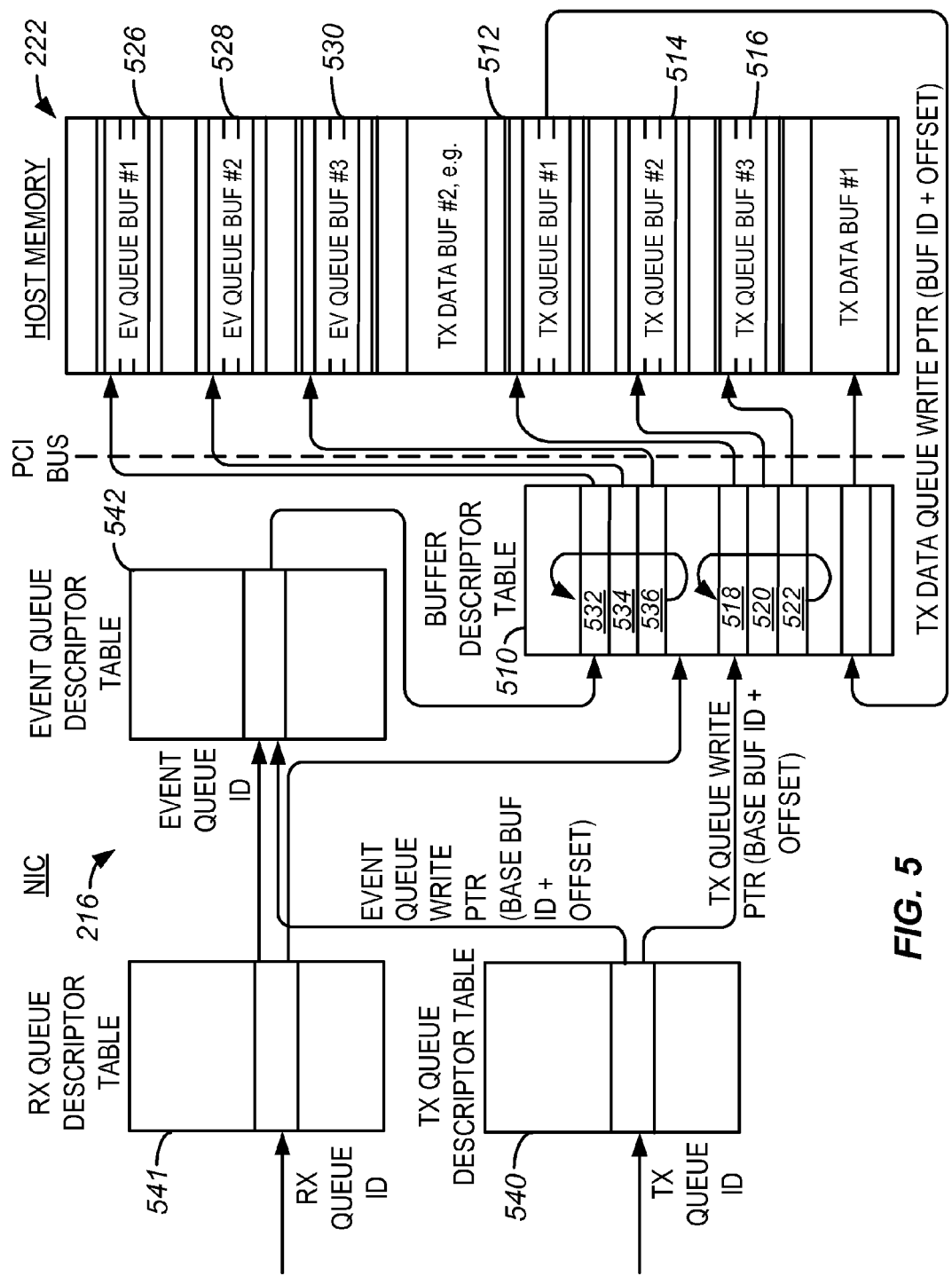
FIG. 5 is a block diagram of data structures used by the system of FIGS. 1 and 2 in order to support separate transmit and receive queues for different VNICs.

FIG. 5 is a block diagram of various data structures used by the system of FIGS. 1 and 2 in order to support separate transmit and receive queues for each of the VNIC. The diagram indicates which structures exist in host memory 122 and which exist on the NIC 116. The transmit and receive data buffers, the transmit and receive DMA descriptor queues, as well as one or more event queues, are all resident in host memory 122 and made up of generalized buffers which can be discontiguous and interspersed with each other in host memory 122. In FIG. 5, the buffers being used as transmit data buffers are identified as "TX DATA BUF #n", and the buffers being used for a transmit queue are identified as "TX QUEUE BUF #n". The buffers being used for the event queue are identified as "EV QUEUE BUF #n". Additional buffers in host memory 122, not shown explicitly in FIG. 5, are used for receive data buffers and for a receive queue. One process may have any number of transmit, receive and event queues, and all of them share the pool of generalized buffers that have been mapped into that process's virtual address space. Other processes use a different pool of generalized buffers mapped into their respective virtual address spaces.

Individual buffers may be either 4 k or 8 k bytes long in one embodiment, and they are chained together into logically contiguous sequences by means of physically contiguous descriptors in a buffer descriptor table 510 stored in the NIC 116. For example, one transmit queue might occupy buffers 512, 514 and 516 in host memory 122, which are discontiguous and possibly out-of-order regions of memory. They are chained together into a single logically contiguous space by the physically contiguous entries 518, 520 and 522 in the buffer descriptor table 510. The entries 518, 520 and 522 are written and managed by the host 114 and are viewed as a wrap-around ring. So for example, if the host wishes to define a transmit buffer list 312 having 64 k entries for transmit data buffer descriptors, and each buffer is 4 k in size, then the host will allocate a physically contiguous sequence of 16 entries in buffer descriptor table 510 for this transmit buffer list. Similarly, one event queue might occupy buffers 526, 528 and 530 in host memory 122. These buffers are discontiguous and possibly out-of-order in host memory, but are chained together into a single logically contiguous wrap-around space by the physically contiguous entries 532, 534 and 536 in the buffer descriptor table 510. The buffer descriptor table 510 is indexed by "buffer ID", and each of its entries identifies, among other things, the base address of the corresponding buffer in host memory 122.

In order to keep track of the state of each of the transmit, receive and event queues for the many user-level applications that might be in communication with NIC 116 at the same time, the NIC 116 includes a transmit queue descriptor table 540, a receive queue descriptor table 541, and an event queue descriptor table 542. Each transmit queue has a corresponding transmit queue ID, which is used as an index into the transmit queue descriptor table 540. The designated entry in the transmit queue descriptor table 540 is the starting point for describing the state and other characteristics of that particular transmit queue, as viewed by the NIC 116. Each such entry identifies, among other things:

whether the queue is a kernel queue, user queue or another kind of queue;
the size of the queue (number of transmit data buffer descriptors it can contain)
the ID of the event queue associated with this transmit queue;
buffer ID of base buffer for this transmit queue;
"device centric" read and write pointers into this transmit queue.

The host 114 maintains "host centric" versions of the read and write pointers as well, and when it is ready to have transmit data transmitted, it so notifies the NIC 116 by writing its updated host centric transmit queue write pointer into the address on the NIC of the device centric transmit queue write pointer for the particular transmit queue.

In order to retrieve current transmit data from a particular transmit queue in host memory 122, the NIC 116 first uses the ID of the particular transmit queue to look up, in the transmit queue descriptor table 540, the buffer ID of the base buffer containing the transmit descriptor queue. The NIC 116 also obtains from the same place, the current device centric buffer list read pointer into that transmit descriptor queue. It then uses the base buffer ID as a base, and the device centric buffer list read pointer high order bits as an offset, into the buffer descriptor table 510, to obtain the base address in host memory 122 of the buffer that contains the particular transmit buffer list 312. The NIC then uses that base address as a base, and the device centric buffer list read pointer low order bits times the number of bytes taken up per descriptor as an offset, to retrieve from host memory 122 the current entry in the particular transmit descriptor queue.

The current entry in the particular transmit descriptor queue contains, among other things:
the buffer ID of the current transmit data buffer;
a byte offset into the current transmit data buffer; and
a number of bytes to be transmitted from the current transmit data buffer.

The NIC 116 then uses the buffer ID of the current transmit data buffer as another index into buffer descriptor table 510 to retrieve the buffer descriptor for the buffer that contains the current transmit data. Note this buffer descriptor is an individual entry in buffer descriptor table 510; unlike the descriptors for buffers containing transmit queues or transmit event queues, this buffer descriptor is not part of a ring. The NIC 116 obtains the physical address in host memory 122 of the current transmit data buffer, and then using that physical address as a base, and the byte offset from the transmit descriptor queue entry as an offset, it determines the physical starting address in host memory 122 of the current data to be transmitted.

The system handles receive queues in a similar manner.

The transmit queue descriptor table 540 entry designated by the transmit queue ID, as previously mentioned, also contains the ID of the transmit event queue associated with the particular transmit queue. Similarly, the receive queue descriptor table 541 entry designated by the receive queue ID contains the ID of the event queue associated with the particular receive queue. All of the event queues for all the applications 222 are described by respective entries in the event queue descriptor table 542. The entry in the event queue descriptor table 542 identified by a queue ID from the transmit or receive queue descriptor table 540 or 541 is the starting point for describing the state and other characteristics of that particular event queue, as viewed by the NIC 116.

Note that as illustrated in FIG. 5, whereas each slot (e.g. 532, 534, 518) shown in the buffer descriptor table 510 represents a single descriptor, each slot (e.g. 526, 528, 514) in the host memory 122 represents a memory "page" of information. A page might be 4 k or 8 k bytes long for example, so if a transmit data buffer descriptor in a transmit queue occupies either 4 or 8 bytes, then each slot 512, 514 or 516 as shown in FIG. 5 might hold 512, 1 k or 2 k transmit data buffer descriptors.

Figure 6:
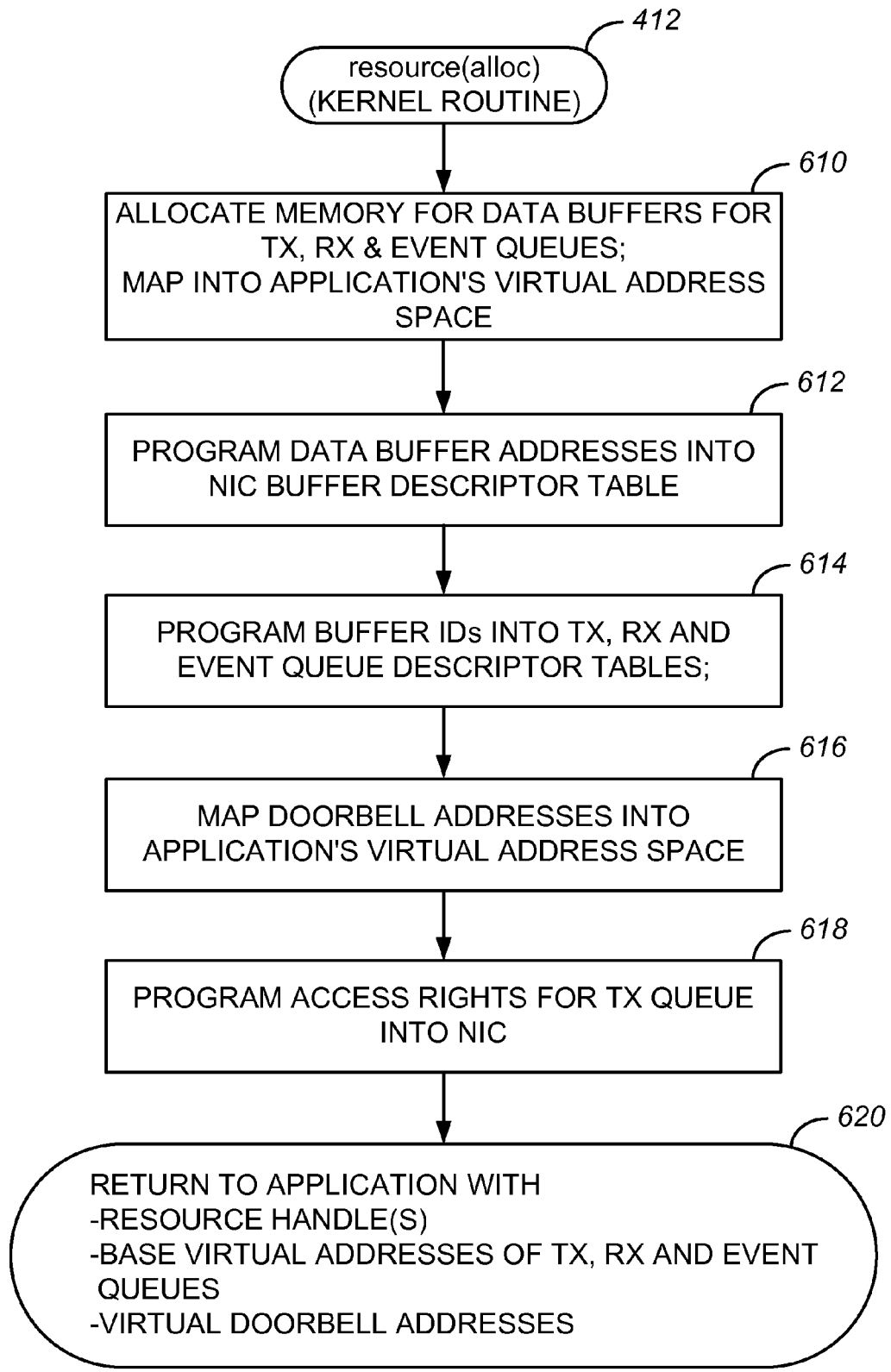
FIG. 6 is a flowchart illustrating significant steps performed by the kernel resource allocation routine of FIG. 4.

FIG. 6 is a flowchart illustrating significant steps performed by the kernel resource allocation routine 412. If the user level transport library 224 fails to call this routine, then the addresses to which the user level transport library 224 would have to access in order to bypass subsequent trusted kernel routines will not be accessible to the user level process since they will not have been mapped into the application's virtual address space. In step 610, the kernel begins by allocating memory for the generalized buffers that will be used to hold the transmit, receive and event queues. It then maps the buffers into the application's virtual address space so that the application can read and write to them directly. In step 612, the kernel routine installs descriptors for these buffers in the buffer descriptor table 510.

In step 614, the kernel routine allocates a minimum set of the buffers for each of the transmit, receive and event queues requested, and programs their buffer IDs into the transmit, receive and event queue descriptor tables 540, 541 and 542. In step 616, the kernel routine determines the "doorbell" address in the NIC 116 for each of the transmit and receive queues, and maps them as well into the application's virtual address space. The doorbell address is the address to which the application will write a value, in order to notify the NIC either that a transmit buffer is ready or that a receive buffer can be released. For transmit queues, the doorbell address is the address of the device centric transmit queue read pointer in the transmit queue descriptor table 540 entry for the particular transmit queue. For receive queues, the doorbell address is the address of the device centric receive queue write pointer in the receive queue descriptor table 541 entry for the particular receive queue.

In step 618, the kernel routine programs into the NIC 116 certain access rights (authorization rights) that are to be associated with the particular transmit queue. These are the authorization rights to which the NIC 116 will look in order to determine whether a particular sending process has authority to send packets having certain characteristics, and the kernel routine programs them in dependence upon the privilege level of the process that made the kernel resource allocation call. Note that although the privilege level of an application process running in the computer system 114 is maintained on a per-process basis, the authorization rights are maintained on the NIC 116 on a per-queue basis. This enables the NIC 116 to validate outgoing transmit packets without having to know anything about the particular operating system running in the host computer or the privilege mechanisms that it uses.

In different embodiments, the NIC can refer to different characteristics of a transmit data packet in order to determine whether the transmit queue has sufficient authority to send it. In one embodiment, the NIC checks only whether the packet is formed according to an allowed transport protocol. For example, in one embodiment user level processes may be permitted to send packets using only the TCP or UDP transport protocols, and no others. Each data packet has a header field which identifies the transport protocol according to which it was formed, and the NIC can compare that protocol number with those that have been programmed into the NIC 116 as being allowed for the transmit queue from which the data packet was retrieved.

If the total array of transport protocols supported by the NIC 116 is short enough, then a field may be allocated in each entry of the transmit queue descriptor table 540 for identifying the allowed protocols. For example if only eight protocols are supported, and eight-bit field might be used, with each bit representing one of the protocols. If a bit is active, then the corresponding transport protocol is allowed; if it is inactive, then it is not.

Alternatively, the allowed protocols may be listed in a separate authorizations "database" maintained in the NIC 116, such as that shown in FIG. 7. In FIG. 7, the authorizations database takes the form of a table in which each entry contains a queue ID and an indication of an allowed protocol for that queue. If several different protocols are allowed for particular queue, then the queue ID appears in several different entries in the table. When the NIC 116 is checking the validity of a transmit packet from a particular transmit queue, it searches the table for an entry that contains both the transmit queue ID and the transport protocol according to which the packet was formed (retrieved from the packet header). If the table does contain such an entry, then the packet is valid. If not, then the packet is rejected. (As used herein, the term "database" does not necessarily imply any unity of structure. For example, two or more separate databases, when considered together, still constitute a "database" as that term is used herein.)

In other embodiments, the NIC can validate other characteristics of a transmit data packet. For example it can validate the source IP address, the source port number, the destination IP address and destination port number, either instead of or additionally to the allowed protocols. FIG. 8 illustrates an example authorizations database that can support validating all such characteristics. As shown in FIG. 8, each entry in the database table contains six fields: source IP address, source port number, destination IP address, destination port number, queue ID and allowed protocol number. In order to keep table short, some of these fields may be filled with indications of numeric ranges, rather than only a specific number. For example, in some systems only privileged processes can transmit packets indicating that they were sourced from a port number in the range 0-1023. In this case, the "source port" field of the table a FIG. 8 might contain only a single bit indicating whether source port numbers within the range 0-1023 are permitted. As with an embodiment using the FIG. 7 table, when the NIC 116 is checking the validity of a transmit packet from a particular transmit queue, it searches the table of FIG. 8 for a single entry that contains (or includes, if numeric ranges are specified) the source IP address, the source port number, destination IP address, destination port number and the allowed protocol (all taken from the packet header), as well as the ID of the transmit queue from which the packet was retrieved. If the table does contain such an entry, then the packet is valid. If not, then it is rejected.

Returning to FIG. 6, after the kernel resource allocation routine programs the authorization rights for the transmit queue into the NIC 116, it returns to the application with handles for the resources allocated, with the base virtual addresses of the transmit, receive and event queues, and virtual memory addresses corresponding to the doorbells allocated in the transmit and receive queue descriptor tables 540 and 541 (step 620).

Figure 9:
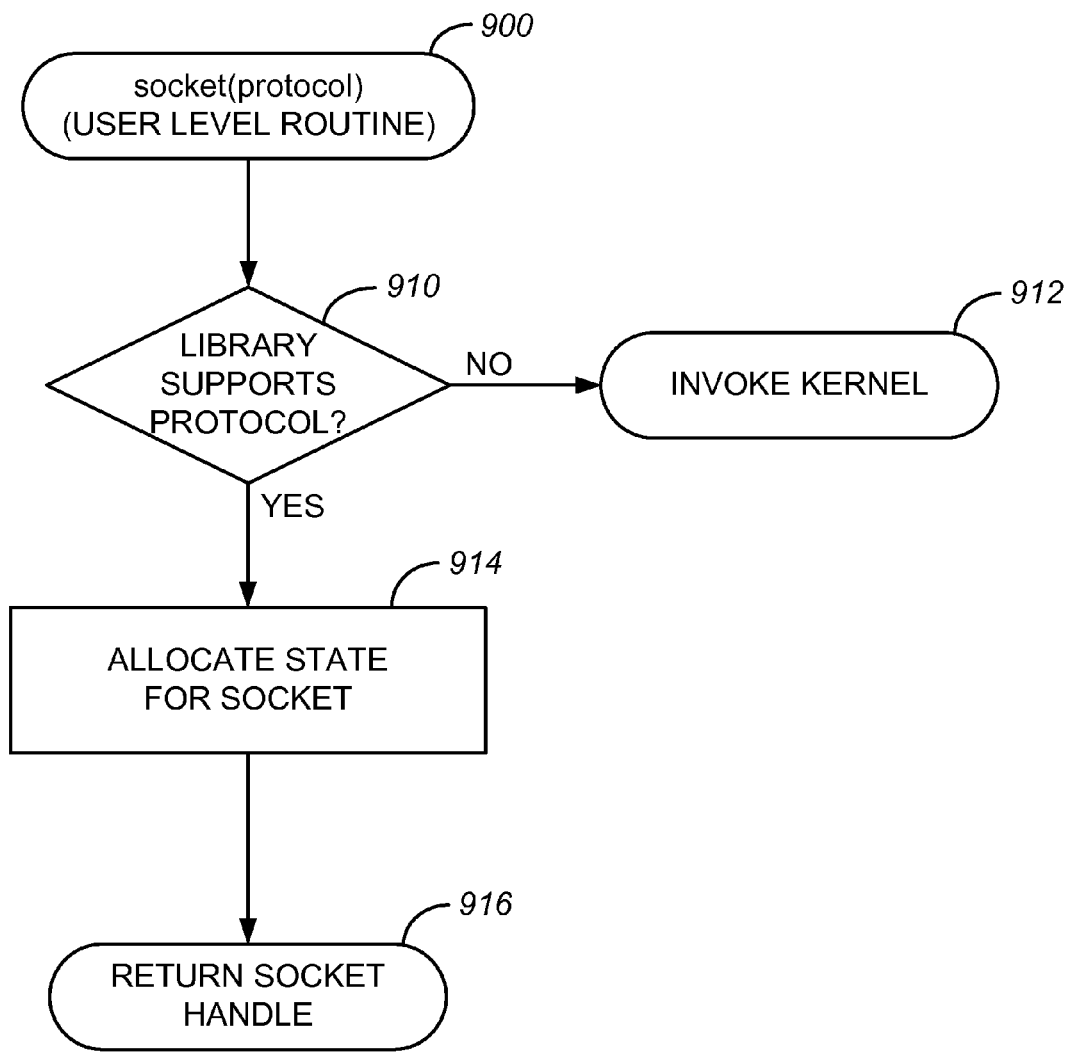
FIG. 9 is a flowchart detail of the user socket routine in FIG. 3.

FIG. 9 is a flowchart of the user level routine 900 in the transport library 224 for establishing a socket. The socket routine is called in both steps 312 and 322 of FIG. 3. In step 910, the routine first determines whether the user level transport library 224 contains the code necessary to support the specified protocol. If not, then in step 912, makes a system call to pass the request on to the kernel to handle. If it does support the specified protocol, then in step 914 it allocates its internal state for the new socket. In step 916 the routine returns to the application program with a handle for the new socket. Note that in a conventional system, in which the socket routine invokes a kernel level process, the kernel may check at this time whether the calling process has authority to use the specified protocol number. This call, and the accompanying context switches, are unnecessary in the system FIGS. 1 and 2 since any illegal protocols will be detected and rejected downstream by the NIC 116.

Figure 10:
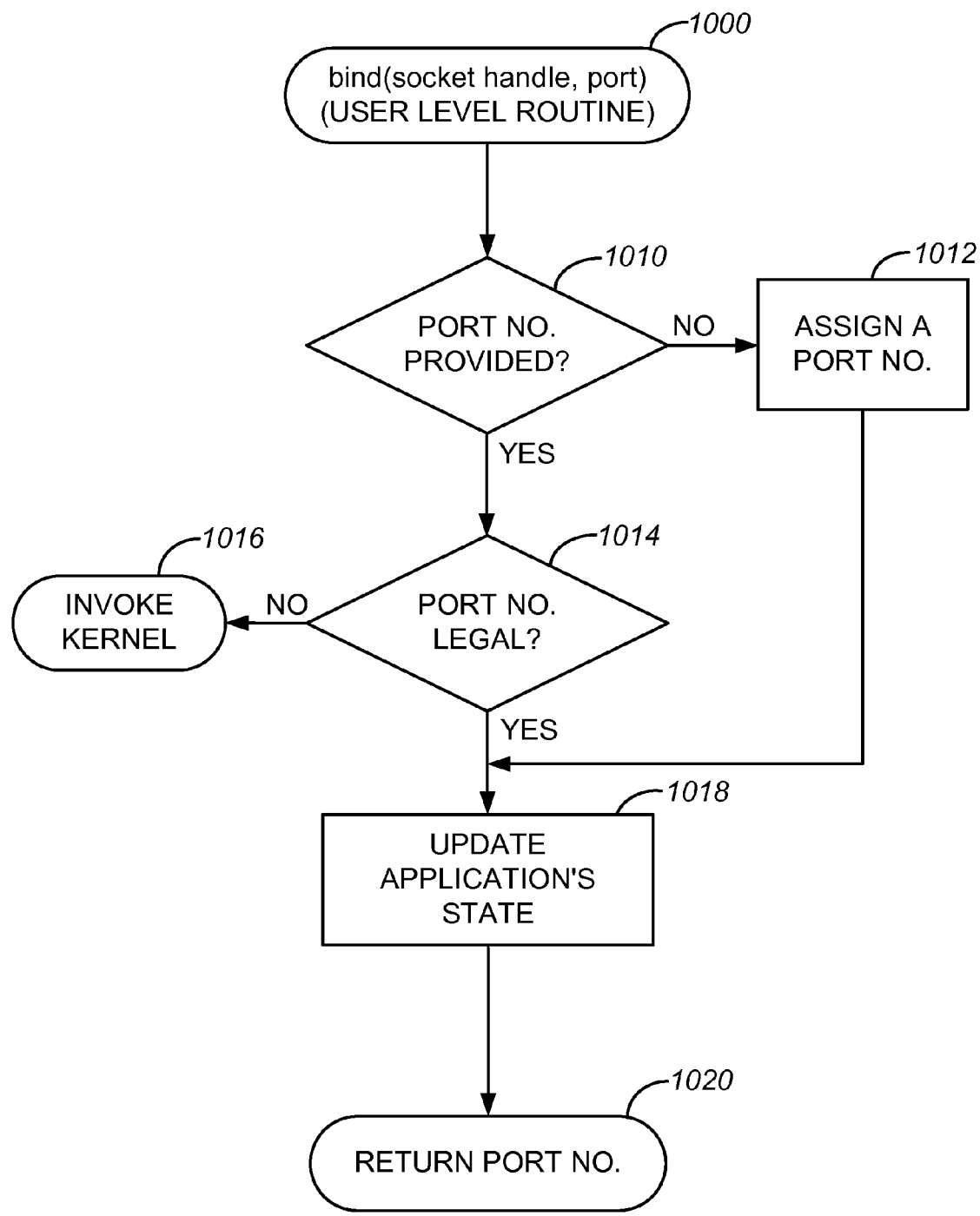
FIG. 10 is a flowchart detail of the bind routine in FIG. 3.

FIG. 10 is a flowchart of the user level routine transport library 224 for binding a port number to a socket. The bind routine is called in both steps 314 and 324 of FIG. 3. In step 1010, the routine first determines whether the caller provided a port number. If not, then in step 1012, a port number is assigned. If the caller did specify a port number, then in step 1014, the routine determines whether the port number is legal for the current user process.

At least four different mechanisms might be used in the same or different embodiments to ensure that different processes do not interfere with each other's use of particular IP address/port number combinations, and that user processes do not improperly operate through physical or logical port numbers or other resources that should be reserved for the kernel. In one mechanism, a system-wide policy exists which allocates all port numbers within a particular range to the user stack only. The user level bind( ) routine can be designed to immediately accept only those requests from a user level process to bind to one of such port numbers, or to immediately pass such requests on to the kernel to handle.

In a second mechanism, during the resource allocation step 412, performed during initialization of a particular instance of the user level driver, the kernel allocates a unique IP address for that instance to use as it wishes. If each instance of the user level driver has its own exclusively assigned IP address, then the instance can manage the available port numbers for use with that IP address without risking interference with any other process. This mechanism is useful only if there are sufficient numbers of IP addresses available to the computer system to allocate to the various requesting processes. Again, this mechanism can be used in conjunction with the first, to reject or pass on to the kernel all user level requests to bind to a kernel-only port number, regardless of the exclusivity of an assigned IP address.

In a third mechanism, again during initialization of a particular instance of the user level driver, the initialization routine makes a number of anticipatory bind( ) calls to the kernel in order to form a pool of port numbers that the user level driver instance can later allocate to the application program upon receipt of bind( ) calls to the user level driver. This mechanism can succeed with far fewer IP addresses available to the computer system, but also undesirably involves a context switch (during library initialization) for each port number to be added to the pool.

In yet a fourth mechanism, no IP address/port number combinations are pre-allocated to the particular instance of the user level driver. Instead, the user level bind( ) routine invokes the kernel bind( ) routine for each user level bind( ) call received. This mechanism utilizes IP address/port number combinations most conservatively, but may require more context switches than any of the first, second and third mechanisms. In an embodiment, this fourth mechanism is used only as a backup, for example if the user level process requires more port numbers than were made available using the anticipatory bind( ) calls in the third mechanism.

If in step 1014 the user level bind( ) routine determines that the requested port number is not available to the current instance of the user level driver, or otherwise cannot determine whether is available, then in step 1016, the routine makes a call to the kernel bind( ) routine to pass the request on to the kernel to handle. If the fourth mechanism above is the only way that the particular embodiment avoids conflicting or illegal allocation of address/port number combinations, then step 1016 will be taken during every user level call to the bind( ) routine 1000. Otherwise, step 1016 will be taken only as a backup if pre-allocated port numbers have been exhausted, or if the routine otherwise cannot determine that the requested port number is available.

If the specified port number is legal, or if a port number was assigned by the routine in step 1012, then in step 1018 the routine updates the application's state internally, to bind the port number with the specified socket. The routine returns to the caller in step 1020.

Although the user level bind routine of FIG. 10 attempts to prevent the allocation of problematical port numbers to user level processes as described above, it will be appreciated that a different implementation of the user level bind routine may not be as careful. It is a feature of the invention that the NIC 116 can be designed to detect and reject transmit packets which do designate a source port number that is illegal, or for which the sending process lacks sufficient privilege to use. Therefore, no damage will occur if transport library routines are used which do not follow the steps set forth, as long as any errors they cause are of a type that the NIC 116 is designed to detect downstream.

Figure 11:
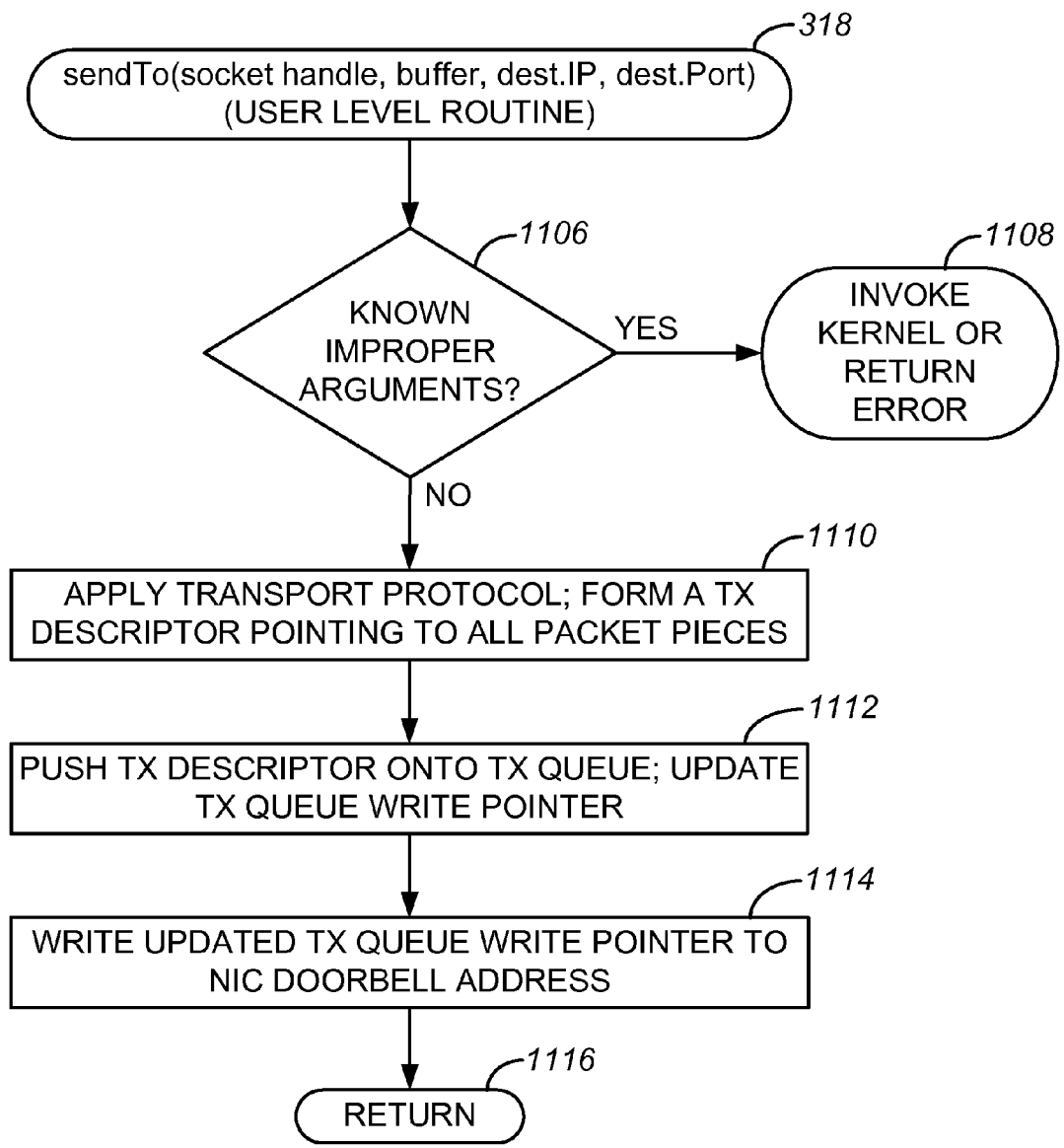
FIG. 11 is a flowchart detail of the sendTo routine in FIG. 3.

FIG. 11 is a flowchart of the user level sendTo routine called in step 318 of FIG. 3. This routine is called for UDP protocol packets for which no connection to a destination IP address or port is established. The routine therefore takes as arguments not only the socket handle and the data buffer address, but also the destination IP address and destination port number. Referring to FIG. 11, in step 1106, the routine first determines whether there are known improper arguments. If so, then in step 1108, it invokes the kernel or returns an error. If not, then in step 1110, the routine first applies the transport protocol, forming a UDP header and an IP header. It then forms a transmit descriptor pointing to the headers and to the data buffer identified by the caller. In step 1112, the routine pushes the transmit descriptor onto the transmit queue by writing the transmit descriptor into the next available entry in transmit queue buffers 512, 514 or 516 (FIG. 5). The routine then updates its own host centric transmit queue write pointer. In step 1114, the routine writes its updated transmit queue write pointer into the NIC 116 at the doorbell address that had been previously associated with the current transmit queue. In step 1116, the routine returns to the caller.

Note that all the steps of FIG. 11 take place entirely within the virtual address space of the current user level process. There is no need to copy data into the kernel address space, nor is there any need to perform a context switch to a kernel process either to perform the protocol processing, to enqueue the new UDP packet, or to notify the NIC 116 of the availability of a new packet in the transmit queue. Additionally, as with the user level socket and bind routines, a user level transport library routine which does not perform the steps faithfully as set forth in FIG. 11 will not cause the transmission of malformed or illegal packets to the extent the NIC 116 is designed to reject them during the validation process performed on the NIC 116.

Figure 12:
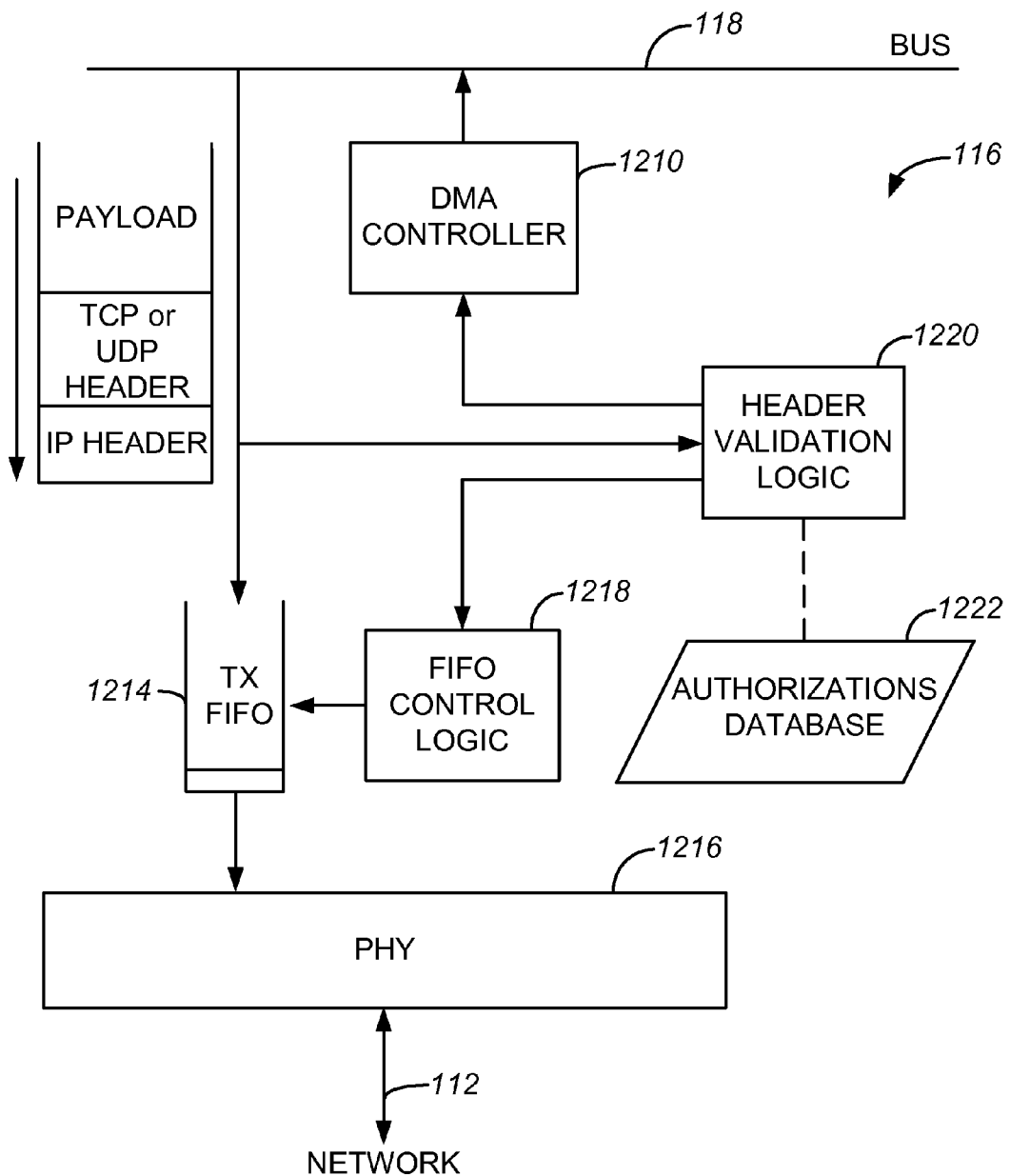
FIG. 12 is a functional block diagram of certain structures on a NIC which can be used to perform packet validation for transmission of data packets.

FIG. 12 is a functional block diagram of certain structures on the NIC 116 which can be used to perform packet validation for transmission of data packets. The structures include a DMA controller 1210 which controls the retrieval of transmit data packets from the host memory subsystem 122. Data packets, as they arrive, are enqueued into a transmit FIFO 1214. From the head of the transmit FIFO 1214, data packets are presented to a physical interface 1216 which performs any further protocol processing (such as appending an Ethernet header) and writes them out onto the network 112. The transmit FIFO 1214 also has associated therewith FIFO control logic 1218, which includes read and write pointers into the transmit FIFO 1214 as well as other functions described hereinafter. The NIC 116 also includes header validation logic 1220 which observes the contents of data packets as they arrive from the bus 118 and are placed into the transmit FIFO 1214. The header validation logic 1220 makes reference to the authorizations database 1222 described previously.

In operation, as a data packet is received from the bus 118, the first section received is the IP header. This section contains the source and destination IP addresses, as well as an identification of the transport layer protocol. Next comes the transport layer header, which contains the source and destination port numbers. Based on this information, the header validation logic 1220 compares the data packet characteristics to those in the authorizations database 1222 to determine whether the data packet arriving from the bus 118 is authorized. If it is not, then the header validation logic 1220 can cause the DMA controller 1210 to abort the current transfer, and can also cause the FIFO control logic 1218 to unwind its write pointer back to the end of the previous packet in the transmit FIFO 1214.

Figure 13:
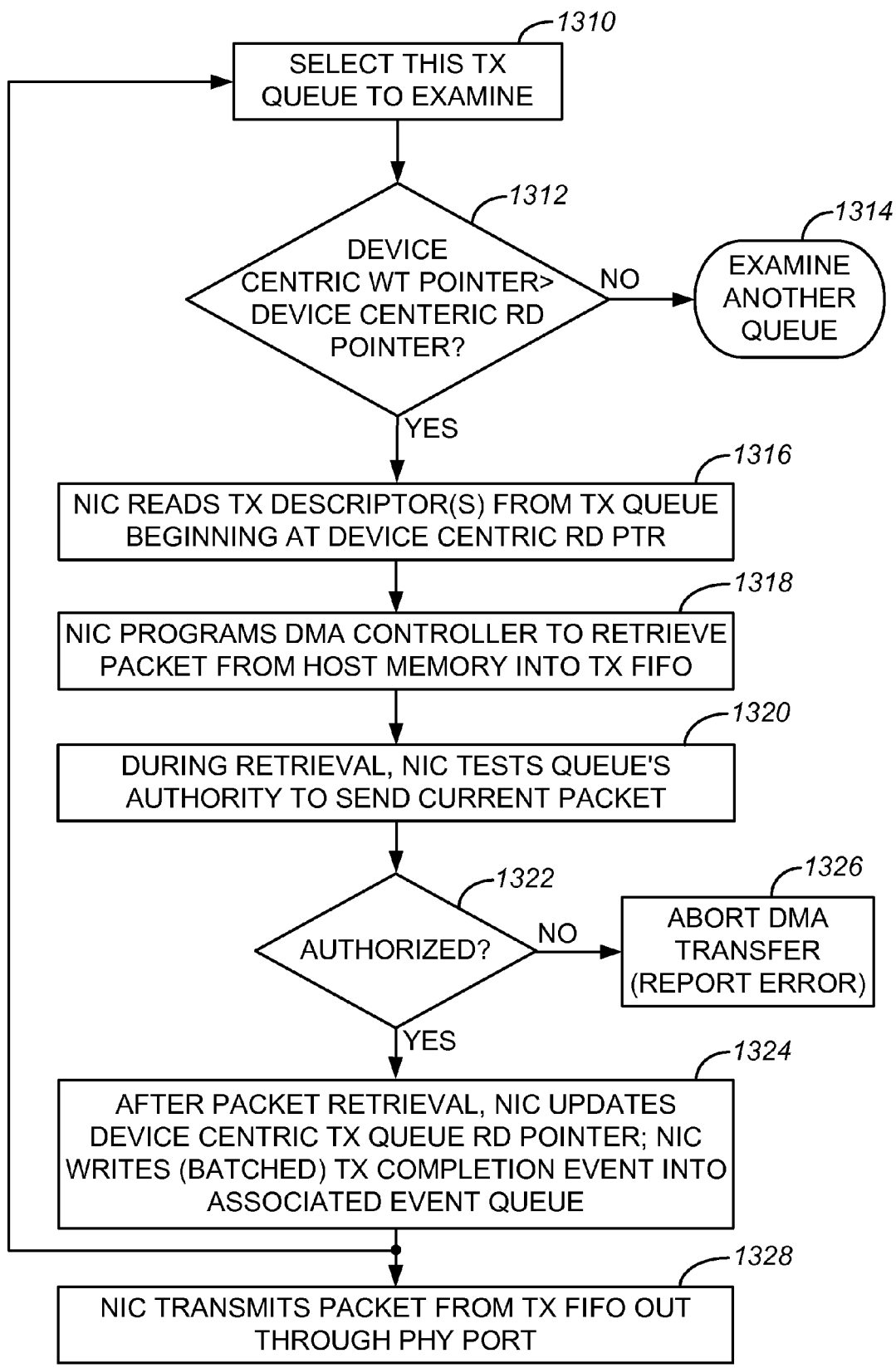
FIG. 13 is a flowchart of typical steps taken on the NIC 116 for transmission of data packets arriving from multiple queues.

FIG. 13 is a flowchart of typical steps taken on the NIC 116 for transmission of data packets arriving from multiple queues. Initially, the NIC implements an algorithm for choosing among the multiple transmit queues for the next queue to service. This algorithm is unimportant for an understanding of the invention, and therefore is not described. In step 1310, the algorithm selects one particular transmit queue to examine.

In step 1312, the NIC 116 determines whether the device centric write pointer for the current transmit queue modulo-exceeds the device centric read pointer for current transmit queue. These values are available to be NIC in the transmit queue descriptor table 540 entry for the current transmit queue, and the test will be positive if one of the transport libraries 224 or 225 has updated the device centric write pointer to notify the NIC of the availability of the data packet for transmission. The term "modulo-exceeds" is used herein to accommodate wrap-around (circular) queues. That is, the device centric write pointer "modulo-exceeds" the device centric read pointer for a queue if the write pointer exceeds the read pointer, modulo the queue length.

If the test of step 1312 is negative, then in step 1314, the NIC 116 proceeds to examine the next transmit queue according to its algorithm.

If the test of step 1312 is positive, then in step 1316, the NIC 116 reads one or more transmit descriptors from the current transmit queue, beginning at the entry pointed to by the device centric read pointer. In step 1318, the NIC 116 programs the DMA controller 1210 to retrieve the packet from host memory 122 into transmit FIFO 1214. In step 1320, during the retrieval process, the NIC examines the header information on the packet as it is being retrieved, and tests the current queue's authority to send packets having the characteristics of that being retrieved. If the NIC 116 determines that the packet is authorized (step 1322), then in step 1324, after packet retrieval, the NIC 116 will updated its device centric transmit queue read pointer. The NIC 116 then writes a transmit completion event into the event queue associated with the current transmit queue, for eventual retrieval by the user level process. In some embodiments, the NIC 116 might wait to complete retrieval of a number of transmit data packets before writing a "batched" transmit completion event covering all of them. The process then returns to step 1310 for the queue selection algorithm to select the same or another transmit queue. Eventually, in step 1328 the NIC 116 transmits the packet from the head of the transmit FIFO 1214 out onto the network 112.

If in step 1322 it is determined that the current packet is not authorized to be sent from the current transmit queue, then in step 1326, the header validation logic 1220 (FIG. 12) causes the DMA controller 1210 to abort the current transfer, thereby freeing up the bus 118. It also notifies the FIFO control logic 1218 to unwind the transmit FIFO queue write pointer as previously described. The NIC 116 may also report an error back to the application program.

It can be seen that the NIC 116 transmits packets onto network 112 only if the sending transmit queue is authorized to transmit packets having the characteristics for which header validation logic 1220 checks. In some embodiments still other requirements might be necessary before the NIC will allow the packet to go out.

As used herein, "identification" of an item of information does not necessarily require the direct specification of that item of information. Information can be "identified" in a field simply by referring to the actual information through one or more layers of indirection, or by identifying one or more items of different information which are together sufficient to determine the actual item of information. In addition, the term "indicate" is used herein to mean the same as "identify".

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A method for interfacing a computing device with a network interface device, for use with a network, comprising the steps of:
   a first sending process of the computing device initiating establishment of a first transmit queue;
   a privileged mode process, in response to the step of the first sending process initiating establishment of a first transmit queue, establishing the first transmit queue in a virtual address space of the first sending process,
   the first sending process enqueueing a first data packet onto the first transmit queue for transmission onto the network, without involvement of any privileged mode routines, the first data packet having a first characteristic;
   the network interface device receiving at least part of the first data packet from the first transmit queue for transmission onto the network;
   the network interface device making a first determination of whether the first sending process has authority to transmit data packets having the first characteristic onto the network, in dependence upon whether the first transmit queue has such authority according to authorization rights maintained on the network interface device on a per-transmit queue basis; and
   the network interface device transmitting the first data packet onto the network only if the first determination is positive.

2. A method according to claim 1, wherein the first characteristic comprises a particular network transport protocol,
   and wherein the step of the network interface device making a first determination comprises the step of the network interface device determining whether the first sending process is authorized to transmit data packets using the particular network transport protocol.

3. A method according to claim 1, wherein the first characteristic comprises a particular source IP port number,
   and wherein the step of the network interface device making a first determination comprises the step of the network interface device determining whether the first sending process is authorized to transmit data packets having the particular source IP port number.

4. A method according to claim 1, wherein the first characteristic comprises a particular destination IP port number,
   and wherein the step of the network interface device making a first determination comprises the step of the network interface device determining whether the first sending process is authorized to transmit data packets having the particular destination IP port number.

5. A method according to claim 1, wherein the first characteristic comprises a particular source IP address,
   and wherein the step of the network interface device making a first determination comprises the step of the network interface device determining whether the first sending process is authorized to transmit data packets having the particular source IP address.

6. A method according to claim 1, wherein the first characteristic comprises a particular destination IP address,
   and wherein the step of the network interface device making a first determination comprises the step of the network interface device determining whether the first sending process is authorized to transmit data packets having the particular destination IP address.

7. A method according to claim 1, wherein the step of the network interface device receiving at least part of the first data packet comprises the step of the network interface device retrieving at least part of the first data packet from the first transmit queue.

8. A method according to claim 1, further comprising the step of the first sending process notifying the network interface device, without invoking any privileged mode routines, of the availability of the first data packet in the first transmit queue.

9. A method according to claim 1, wherein the first sending process is a user level process,
   further comprising the step of a privileged mode process, in response to the step of the first sending process initiating establishment of a first transmit queue, programming authorization rights for the first transmit queue into a database accessible to the network interface device,
   and wherein the step of the network interface device making a first determination comprises the step of the network interface device examining the authorization rights for the first transmit queue in the database.

10. A method according to claim 1, further comprising the steps of:
    a second sending process initiating establishment of a second transmit queue;
    a privileged mode process, in response to the step of the second sending process initiating establishment of a second transmit queue, establishing the second transmit queue in a virtual address space of the second sending process;
    the second sending process enqueueing a second data packet onto the second transmit queue for transmission onto the network, the second data packet having a second characteristic;
    the network interface device receiving at least part of the second data packet from the second transmit queue;
    the network interface device making a second determination of whether the second sending process has authority to transmit data packets having the second characteristic onto the network; and
    the network interface device transmitting the second data packet onto the network only if the second determination is positive.

11. A method according to claim 10, wherein the second sending process is a user level process, further comprising the step of a privileged mode process, in response to the step of the second sending process initiating establishment of a second transmit queue, programming authorization rights for the second transmit queue into the database accessible to the network interface device,
    and wherein the step of the network interface device making a second determination comprises the step of the network interface device examining the authorization rights for the second transmit queue in the database.

12. A method according to claim 1, wherein the step of the network interface device receiving at least part of the first data packet comprises the step of the network interface device retrieving at least part of the first data packet from the first transmit queue,
    further comprising the step of aborting retrieval of the first data packet if the first determination is negative.

13. A system comprising:
    a computing device; and
    network interface device in communication with the computing device via a physical bus, wherein the computing device is configured such that:
       in response to a first sending process of the computing device initiating establishment of a first transmit queue, a privileged mode process of the computing device establishes the first transmit queue in a virtual address space of the first sending process, and in response to the first sending process enqueueing a first data packet onto the first transmit queue for transmission onto a network, the first data packet having a first characteristic, the network interface device receives at least part of the first data packet without involvement of any privileged mode routines of the computing device;

and wherein the network interface device is configured to make a first determination as to whether the first sending process has authority to transmit data packets having the first characteristic onto the network, in dependence upon whether the first transmit queue has such authority according to authorization rights maintained on the network interface device on a per-transmit queue basis, and to transmit the first data packet onto the network only if the first determination is positive.

* * * * *